(12) United States Patent
Fiaschetti et al.

(10) Patent No.: US 11,008,004 B2
(45) Date of Patent: May 18, 2021

(54) VEHICULAR LANE KEEPING SYSTEM

(71) Applicant: MAGNA ELECTRONICS INC., Auburn Hills, MI (US)

(72) Inventors: John Fiaschetti, Rochester Hills, MI (US); Pranav Bhatkhande, Auburn Hills, MI (US); Tarig Mahameed, Dearborn Heights, MI (US); G. Edzko Smid, Oxford, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 170 days.

(21) Appl. No.: 16/435,809

(22) Filed: Jun. 10, 2019

(65) Prior Publication Data

US 2019/0291732 A1    Sep. 26, 2019

Related U.S. Application Data

(63) Continuation of application No. 15/291,318, filed on Oct. 12, 2016, now Pat. No. 10,315,651.

(60) Provisional application No. 62/240,772, filed on Oct. 13, 2015.

(51) Int. Cl.
*B60W 30/12* (2020.01)
*B60W 50/14* (2020.01)
*B62D 15/02* (2006.01)
*G06K 9/00* (2006.01)

(52) U.S. Cl.
CPC ............ *B60W 30/12* (2013.01); *B60W 50/14* (2013.01); *B62D 15/025* (2013.01); *B62D 15/029* (2013.01); *B60W 2050/143* (2013.01); *B60W 2420/42* (2013.01); *G06K 9/00798* (2013.01)

(58) Field of Classification Search
CPC ..................................................... B60W 30/12
See application file for complete search history.

(56) References Cited

U.S. PATENT DOCUMENTS

| 5,550,677 | A | 8/1996 | Schofield et al. |
| 5,670,935 | A | 9/1997 | Schofield et al. |
| 5,949,331 | A | 9/1999 | Schofield et al. |
| 6,882,287 | B2 | 4/2005 | Schofield |
| 8,160,780 | B2 * | 4/2012 | Shin ...................... B62D 15/00 701/43 |
| 8,694,224 | B2 | 4/2014 | Chundrlik, Jr. et al. |
| 8,744,685 | B2 * | 6/2014 | Nakano ................ B62D 15/025 701/41 |
| 9,090,234 | B2 | 7/2015 | Johnson et al. |

(Continued)

*Primary Examiner* — Michael A Berns
(74) *Attorney, Agent, or Firm* — Honigman LLP (57) ABSTRACT

A vehicular lane keeping assist system includes a camera and a control having an image processor that processes image data captured by the camera to determine lane boundaries defining a traffic lane of a road traveled by the vehicle. The control adjusts control of steering of the vehicle responsive to determination that the vehicle is traveling along a curved section of the road traveled by the vehicle. The control controls steering of the vehicle at a first degree responsive to determination that the vehicle is at or near a determined first lane boundary of the traffic lane at an inboard region of the curved section of the road, and the control controls steering of the vehicle at a second degree responsive to a determination that the vehicle is at or near a determined second lane boundary of the traffic lane at an outboard region of the curved section of the road.

25 Claims, 9 Drawing Sheets

(56) References Cited

U.S. PATENT DOCUMENTS

| | | |
|---|---|---|
| 9,180,908 B2 | 11/2015 | Van Dan Elzen et al. |
| 9,260,095 B2 | 2/2016 | Chundrlik, Jr. et al. |
| 9,264,673 B2 | 2/2016 | Chundrlik, Jr. et al. |
| 9,340,227 B2 | 5/2016 | Bajpai |
| 9,604,667 B2 * | 3/2017 | Noh ............... B62D 15/025 |
| 9,625,910 B2 * | 4/2017 | Choi ............... B62D 15/0255 |
| 9,946,940 B2 | 4/2018 | Gupta et al. |
| 10,315,651 B2 | 6/2019 | Fiaschetti et al. |
| 2013/0190985 A1 * | 7/2013 | Nakano ............ B62D 15/025 |
| | | 701/41 |
| 2013/0231830 A1 | 9/2013 | Van Dan Elzen et al. |
| 2014/0052340 A1 | 2/2014 | Bajpai |
| 2014/0375476 A1 | 12/2014 | Johnson et al. |
| 2015/0166062 A1 | 6/2015 | Johnson et al. |
| 2015/0266422 A1 | 9/2015 | Chundrlik, Jr. et al. |
| 2016/0162743 A1 | 6/2016 | Chundrlik, Jr. et al. |
| 2016/0180180 A1 | 6/2016 | Gupta et al. |
| 2016/0325682 A1 | 11/2016 | Gupta et al. |
| 2017/0011633 A1 | 1/2017 | Boegel |
| 2017/0032196 A1 | 2/2017 | Gupta |
| 2017/0108863 A1 | 4/2017 | Chundrlik, Jr. et al. |
| 2017/0158197 A1 | 6/2017 | Johnson et al. |
| 2017/0262712 A1 | 9/2017 | Chundrlik, Jr. et al. |

* cited by examiner

FIG. 1

Basic Algorithm Structure

- 5 Main sections
  - Vehicle Coordinate Transformation
  - Control State Machine and Error Calculation
  - Compute Commanded Steering Angle
  - Convert Angle to Vehicle Signal
  - Output to CAN

VEHICULAR LANE KEEPING SYSTEM

CROSS REFERENCE TO RELATED APPLICATIONS

The present application is a continuation of U.S. patent application Ser. No. 15/291,318, filed Oct. 12, 2016, now U.S. Pat. No. 10,315,651, which claims the filing benefits of U.S. provisional application Ser. No. 62/240,772, filed Oct. 13, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides lane monitoring and lane departure warning responsive to a determination that the vehicle is moving out of a lane in which it is traveling (and when the driver has not actuated a turn signal indicator). The lane monitoring and lane departure warning or lane keeping system is responsive to a rate at which the vehicle approaches the lane boundary, and thus the system may generate a warning (and/or take control of the vehicle steering and/or brakes and/or accelerator) sooner if the vehicle rapidly approaches the lane boundary as compared to a later warning or control if the vehicle slowly approaches or drifts towards the lane boundary.

The present invention provides an enhanced lane keeping method or system that may act as a basis for autonomous steering systems and driver assistance systems. The system of the present invention provides ease of scaling across multiple customers and platforms via a simplified method that provides improved performance and enhanced means of controlling the feel of the algorithm.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
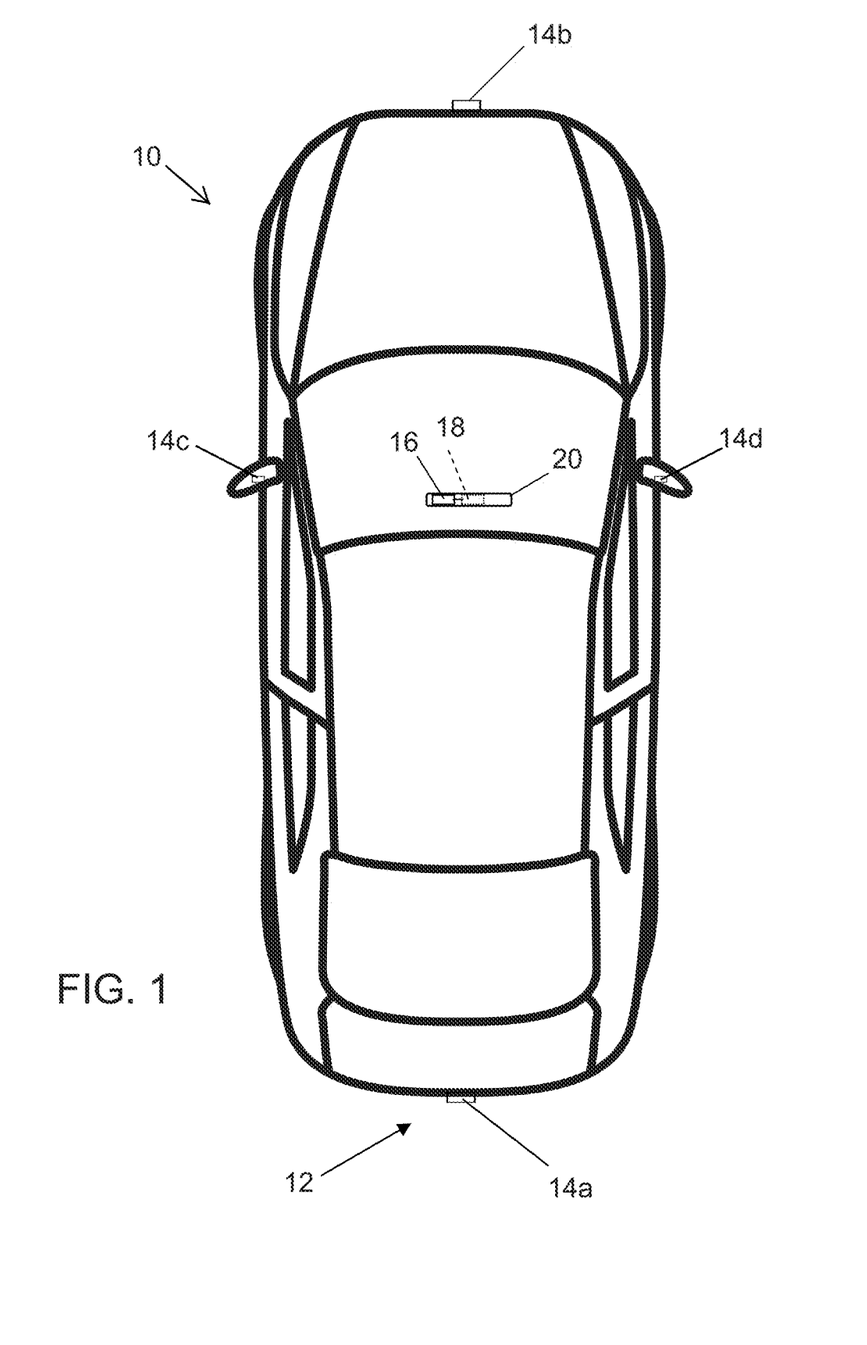
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The present invention provides a lane keeping assist system that operates to limit lane departure and maintain the vehicle within the lane. The system of the present invention provides a moving lateral imaginary or virtual lane boundary (the imaginary line at which the system controls the vehicle when the vehicle crosses the imaginary line), and adjusts the lateral boundary responsive to a lateral speed of the vehicle relative to the determined lane marker or lane boundary (in other words, the lateral boundary adjustment is responsive to the speed or rate of approach of the vehicle to the lane marker or boundary). The system also includes a plurality of time-varying filters (such as Kalman Filters) and linear-quadratic regulator (LQR) using polynomials for the parameters, and uses a selected filter depending on the speed of the vehicle. This allows for a nonlinear treatment of the vehicle control without dealing with linearizing in real time. The system also provides an initial hard correction of the steering of the vehicle (when the vehicle first crosses the imaginary/virtual boundary line), with the degree of correction (and steering torque) being dependent on the lateral speed of the vehicle relative to the lane boundary, and then provides a secondary softer correction to adjust the vehicle position in the lane and to maintain the vehicle in the lane as the vehicle travels along the road. The system may utilize aspects of the systems described in U.S. Pat. Nos. 9,090,234; 8,694,224; 6,882,287 and/or U.S. Publication Nos. US-2016-0180180; US-2015-0166062; US-2013-0231830 and/or US-2014-0052340, and/or U.S. patent application Ser. No. 15/147,301, filed May 5, 2016 and published Nov. 10, 2016 as U.S. Publication No. US-2016-0325682, and/or Ser. No. 15/221,913, filed Jul. 28, 2016, now U.S. Pat. No. 10,268,904, which are all hereby incorporated herein by reference in their entireties.

Figure 2:
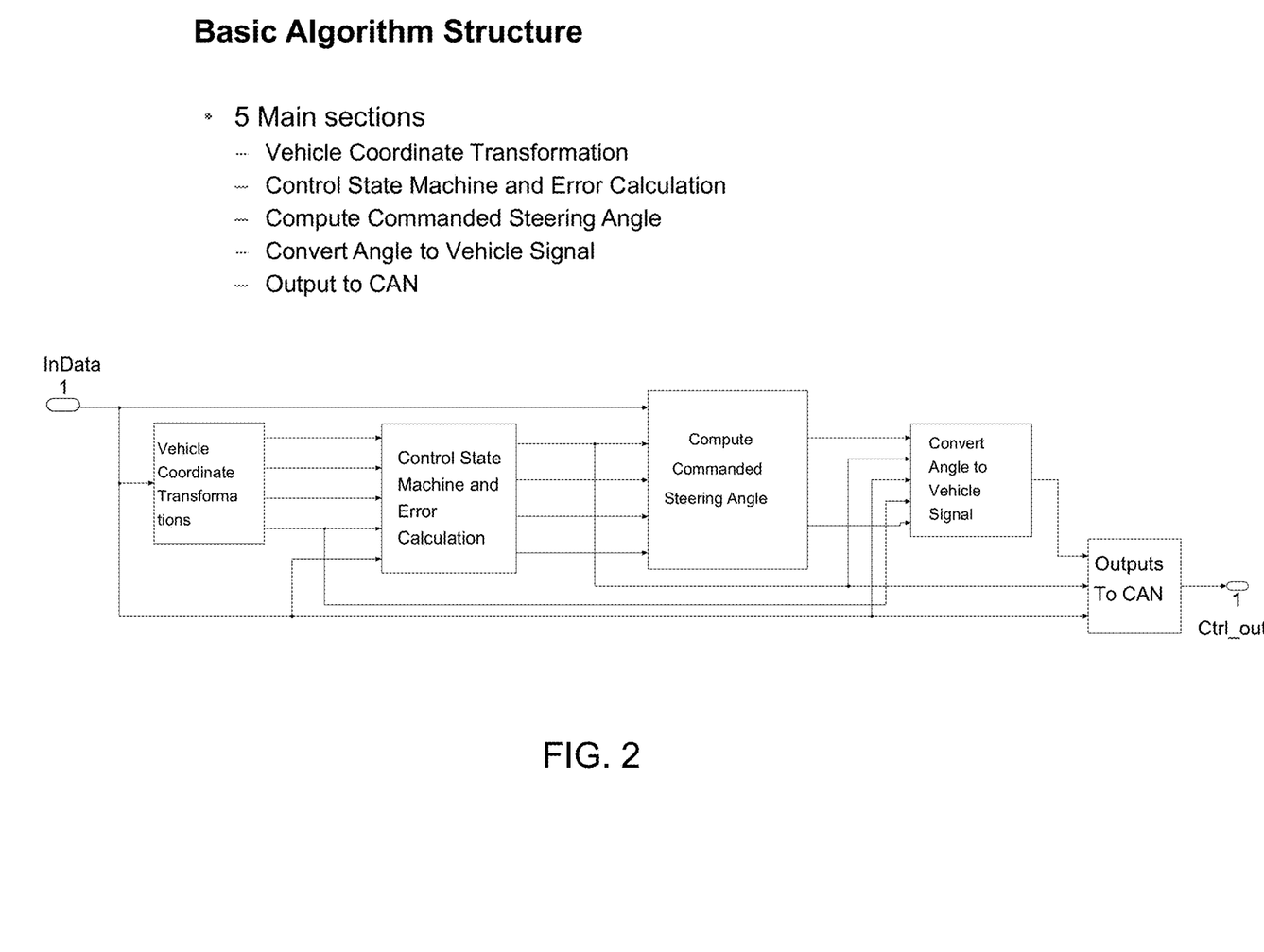
FIG. 2 is a schematic showing five sections of the algorithm structure of the system of the present invention.

The system or algorithm of the present invention has multiple sections. For example, and as shown in FIG. 2, the system may have five main or principal sections, including a Vehicle Coordinate Transformation section, a Control State Machine and Error Calculation section, a Compute Commanded Steering Angle section, a Convert Angle to Vehicle Signal section and an Output to CAN section.

Figure 3:
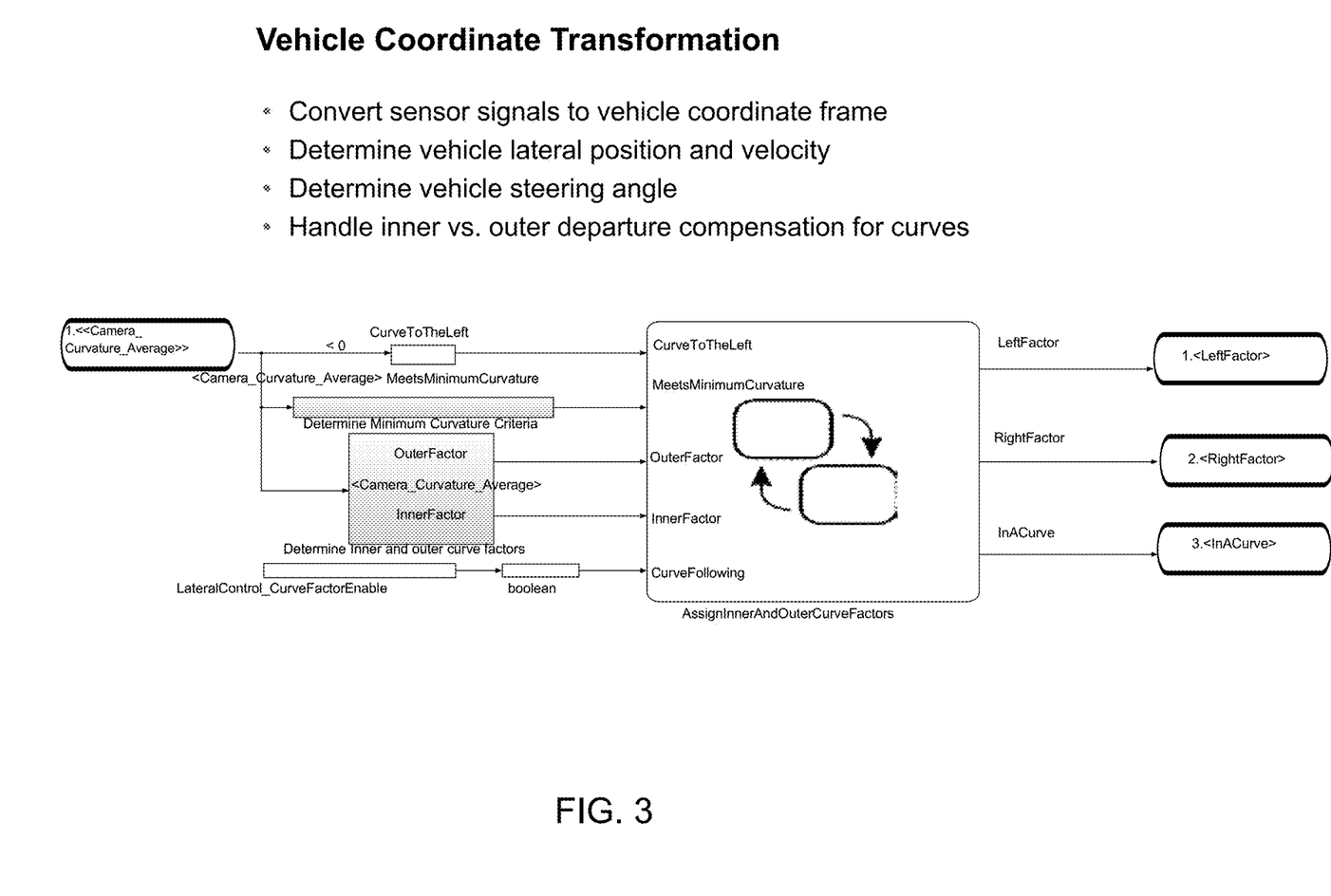
FIG. 3 is a schematic of a vehicle coordinate transformation of the system of the present invention.

As shown in FIG. 3, the vehicle coordinate transformation section converts sensor signals to a vehicle coordinate frame. The section determines the vehicle lateral position and velocity as the vehicle travels along the lane and determines the vehicle steering angle. The system also handles inner vs. outer departure compensation for curves, and may vary how such curves are handled or controlled depending on whether the vehicle is at the inside of the curve or the outside of the curve.

For example, the system may control a vehicle traveling at the inner curve with softer corrections, and may provide harder corrections when the vehicle is traveling along the radially outboard region or outer part of the curved road. In other words, the system may adjust to a lesser degree (softer corrections) if the vehicle travels along the inner part of the lane along a curve, due to the tendency of many drivers to hug the inside of a curve while driving along the curve, and may adjust to a greater degree (harder corrections) if the vehicle travels along the outer part of the lane along a curve, since it is more likely that such a path of travel is not intentional and may be indicative of an unintentional lane departure. The below curve factors may be applied to the correction:

$$\text{Outer Factor } 1 + |\text{Curvature}| * \frac{\text{Gain}}{\text{Curvature}_{Max}}$$

$$\text{Inner Factor } 1 - |\text{Curvature}| * \frac{\text{Gain}}{\text{Curvature}_{Max}}$$

The Control State Machine and Error Calculation section is operable to determine criteria for intervening to provide lateral control assistance, such as when to start and stop an intervention and determine a target for final vehicle trajectory within the lane and desired vehicle path. The present invention provides a method for determining when a vehicle will cross the lane boundary based on its lateral velocity, and determines the control error for providing correction.

Figure 4:
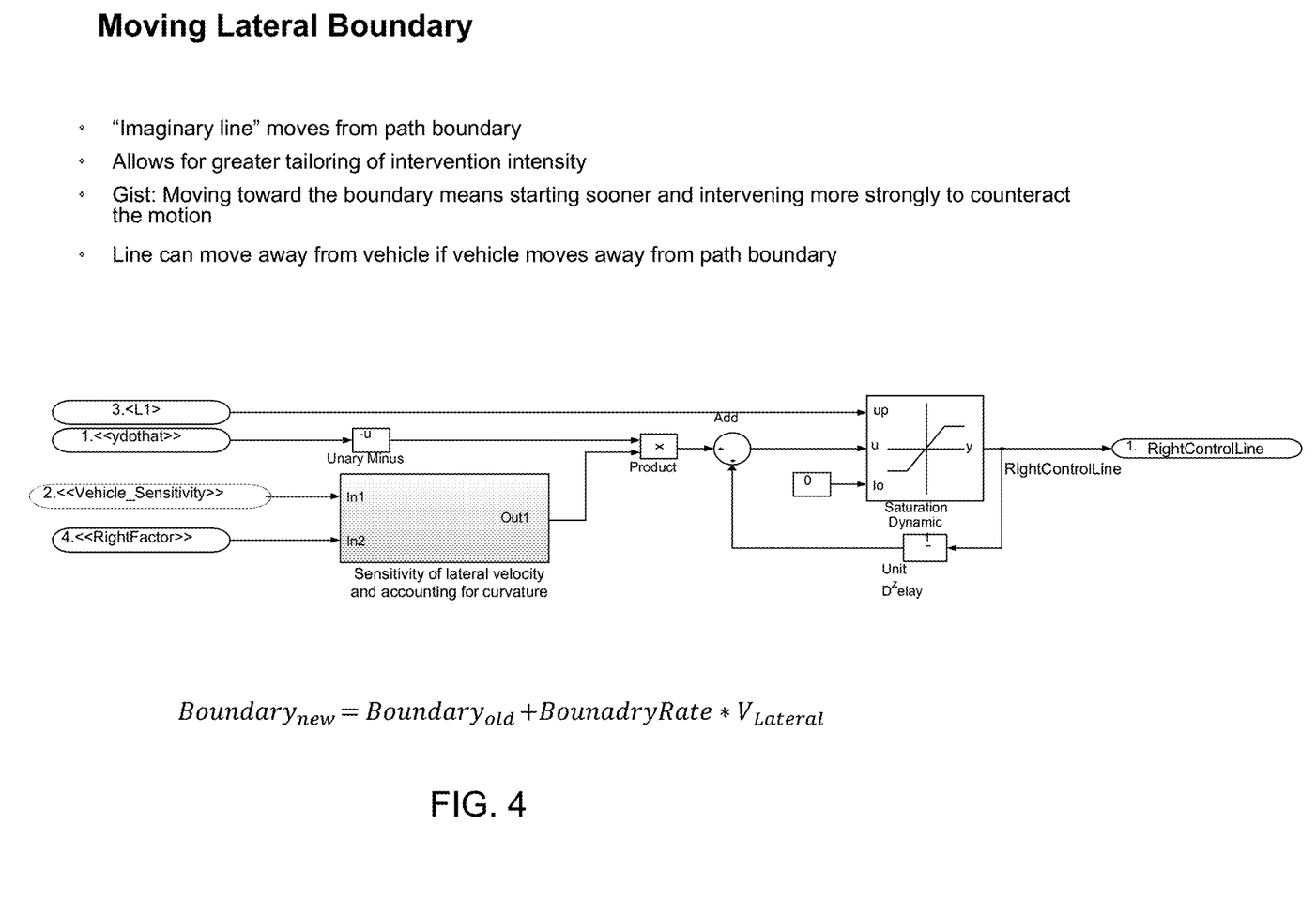
FIG. 4 is a schematic of an algorithm or system that determines a moving lateral boundary line and adjusts the boundary responsive to movement of the vehicle in accordance with the present invention.

The system of the present invention determines a moving lateral boundary by determining or calculating an "imaginary line" or "virtual line" that moves from the path boundary (see FIG. 4). The imaginary/virtual boundary line is determined along or parallel to the determined lane marker and may move inboard (towards a centerline of the lane) or outboard (towards the lane marker at that side) responsive to the vehicle movement and lateral movement velocity. This allows for greater tailoring of the system's intervention intensity. By moving the boundary towards the vehicle, the system may respond to the vehicle movement sooner and may intervene more strongly to counteract the motion of the vehicle. The boundary line can move away from vehicle if vehicle moves away from the lane markers or path boundary (such as towards the center region of the lane).

The system of the present invention determines and processes various criteria for beginning and ending a control action. For example, the system begins (to alert and/or control and/or respond) if the vehicle moves over the moving lateral boundary (which may be at any location depending on the lateral speed of the vehicle relative to the lane markers or centerline of the lane along which the vehicle is traveling). The ending is more complicated, and is responsive to the vehicle being moved or urged or steered back inside a determined target position (inside the lane edge), heading close to a determined or appropriate target heading, with a lateral velocity being less than a threshold or target level (i.e., the vehicle is back in the lane and traveling in a direction generally along the lane and not moving substantially laterally relative to the lane direction). The system may include additional lateral position criteria to prevent over correcting beyond a customer-specific or application-specific position in a lane.

The system provides error treatment to account for errors that may occur in processing or operation of the system. For example, the system may utilize four state variables, including lateral position error, lateral velocity error, heading error and yaw rate error. The system measures the error(s) in lateral position and velocity based on vehicle inputs and the determined distance from the physical lane boundary (such as the determined lane markers). The system may refine measurements and estimate the vehicle heading and yaw rate using, for example, a Kalman Filter or the like.

Figure 5:
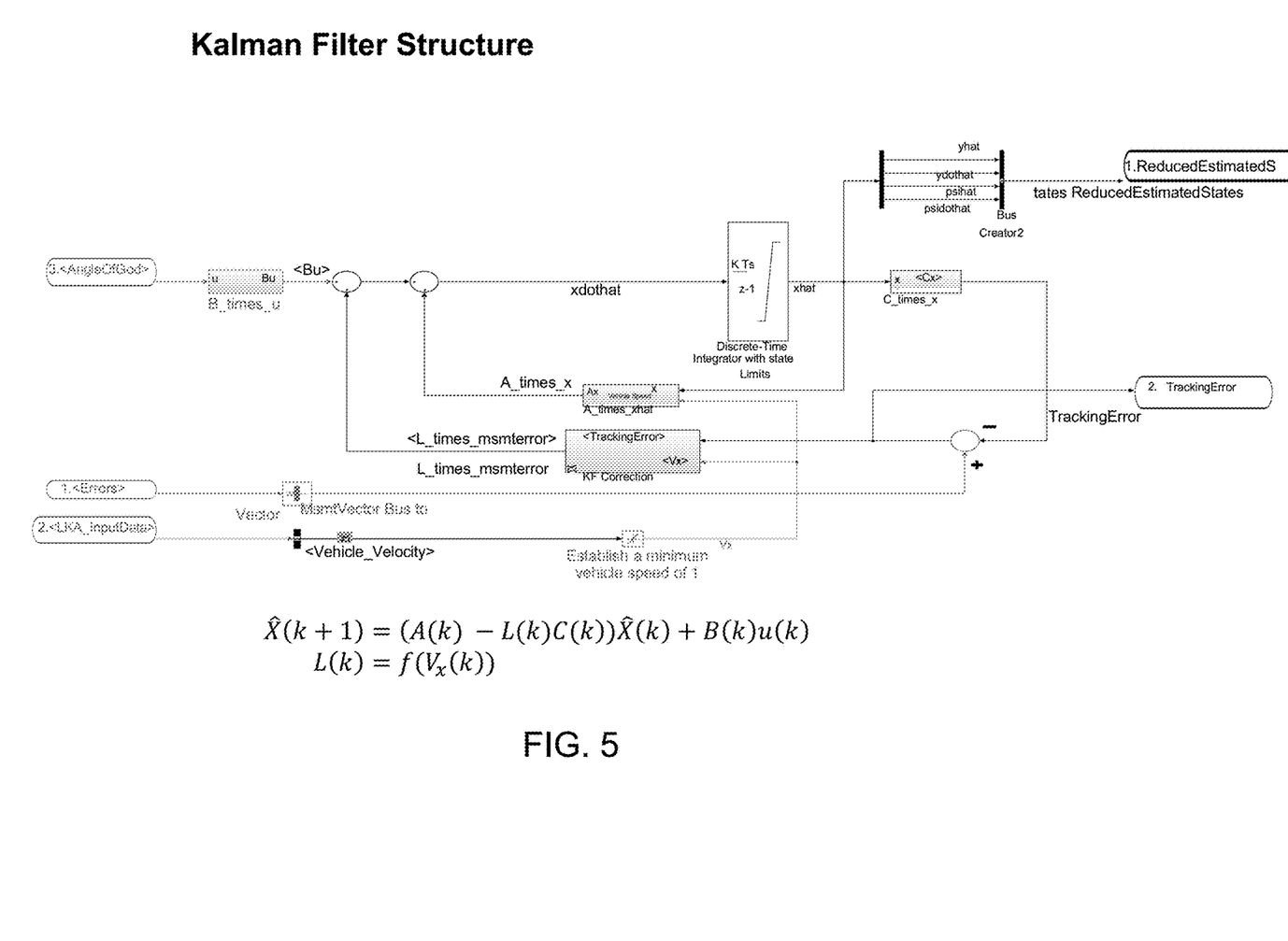
FIG. 5 is a schematic of a Kalman Filter structure of the system of the present invention.

For example, a time-varying Kalman Filter (FIG. 5) may be used that varies with time and vehicle speed. The filter may use a dynamic model with vehicle speed and time parameters to get reasonable approximation of dynamics. The filter corrections are stored as polynomials to allow for time-varying elements without re-computing at each time. The system thus may store a plurality of filter corrections and may select an appropriate filter depending on the current speed of the vehicle, thus reducing processing requirements of the system.

The system is operable to compute the controlled steering angle via a feedforward (FF) control and a feedback (FB) control. The FF control provides an initial correction and dampens out departure, such that the vehicle is moved back into the lane and is traveling generally in the direction of the lane. The FB control finalizes the location and heading of the vehicle in the lane and adds stability and accounts for errors. Both FF and FB are not active simultaneously. Rather, the system transitions from FF to FB control. This helps in the driver feel and allows for initial correction to be more immediate (and not waiting for dynamics to catch up). The logic is based on a reduction in lateral velocity, and the system chooses a target reduction ratio and when that target is met, the system switches to FB control to finish.

Figure 6:
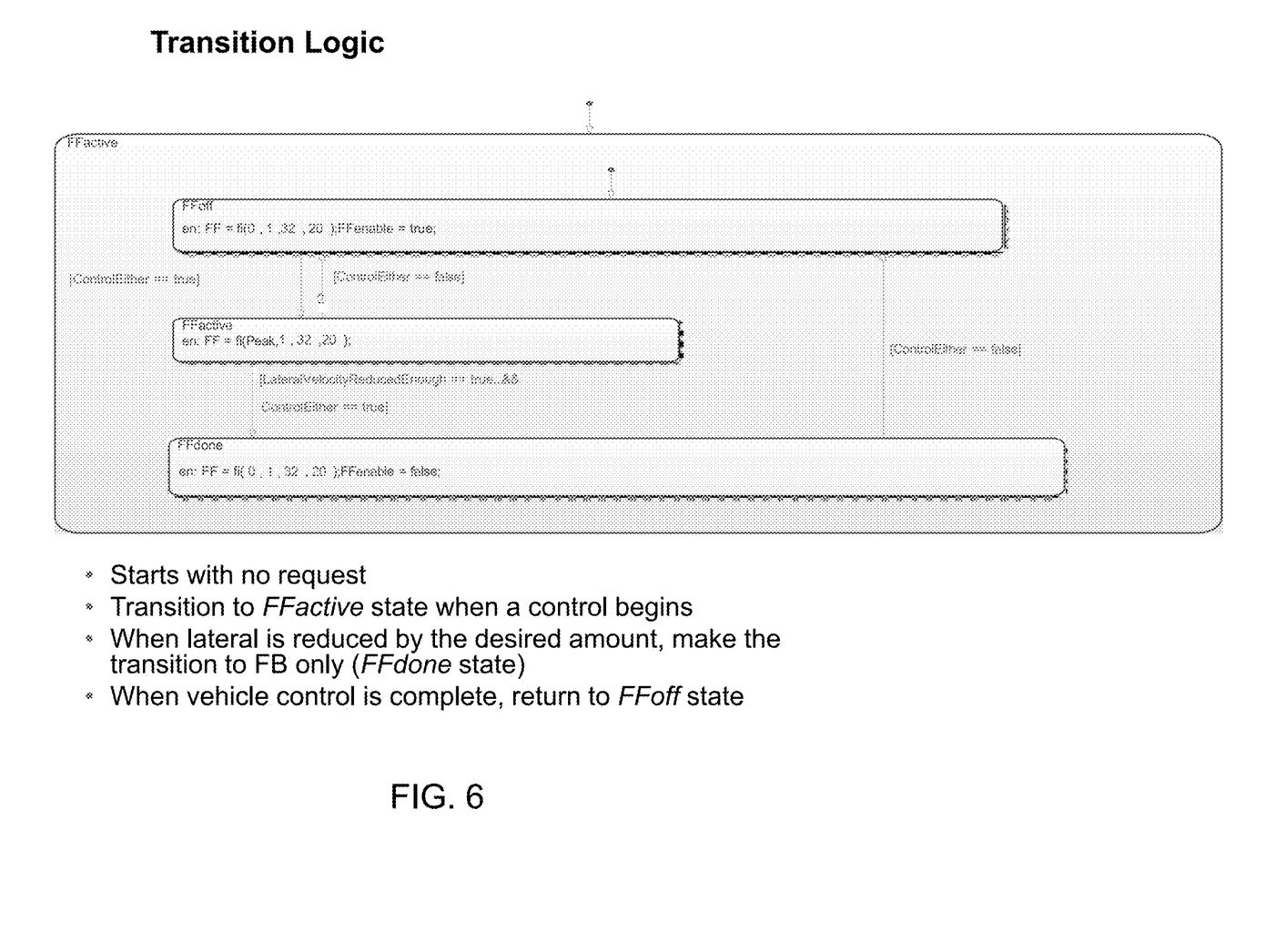
FIG. 6 is a schematic of the transition logic of the system of the present invention.

As shown in FIG. 6, the transition logic starts with no request (in an FFoff state) and transitions to an FFactive state when a control begins (such as when the system determines that the vehicle is at or over the moving boundary line and the system controls a vehicle system, such as steering or braking or the like). When the lateral velocity of the vehicle is reduced by the desired amount (such as after an initial correction to move the vehicle back into the lane and a second correction to set the vehicle direction of travel generally along the lane), the system then transitions to the FB state (FFdone state), where further steering corrections may be provided to steer the vehicle along and within the lane. Then, when or after the vehicle control is complete (and the vehicle is traveling in the lane within the boundary lines and within or below a target or threshold lateral velocity), the system returns to the FFoff state.

Figure 7:
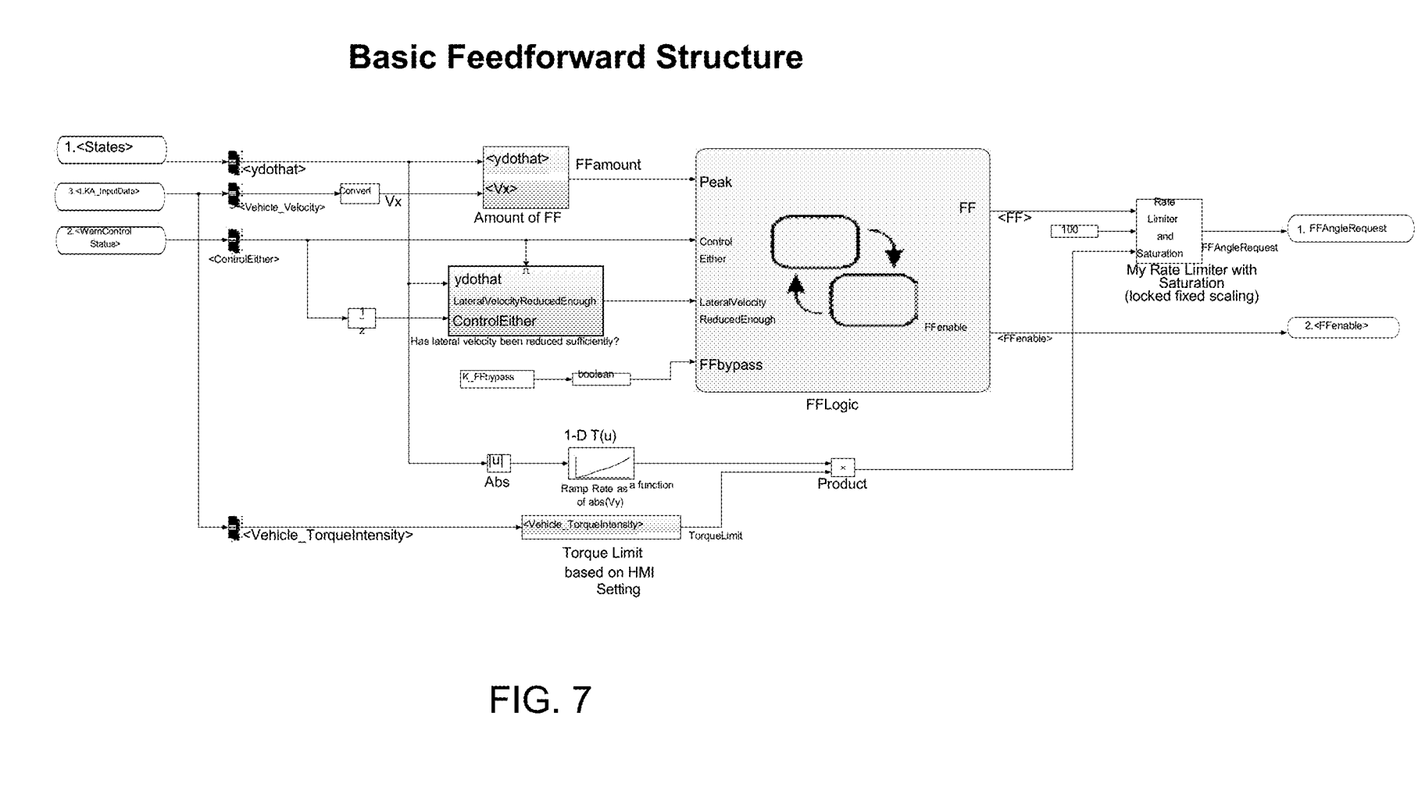
FIG. 7 is a schematic of a feedforward system or process of the present invention.

The feedforward (FF) state (FIG. 7) is operable to compute a maximum FF amount as a function of the vehicle speed. This allows for tailoring of the system to suit the current driving conditions. The system may control the rate of applying the FF via rate limiting, which allows for smoother feel for driver and limits or substantially prevents any complications with the power steering system of the vehicle.

Figure 8:
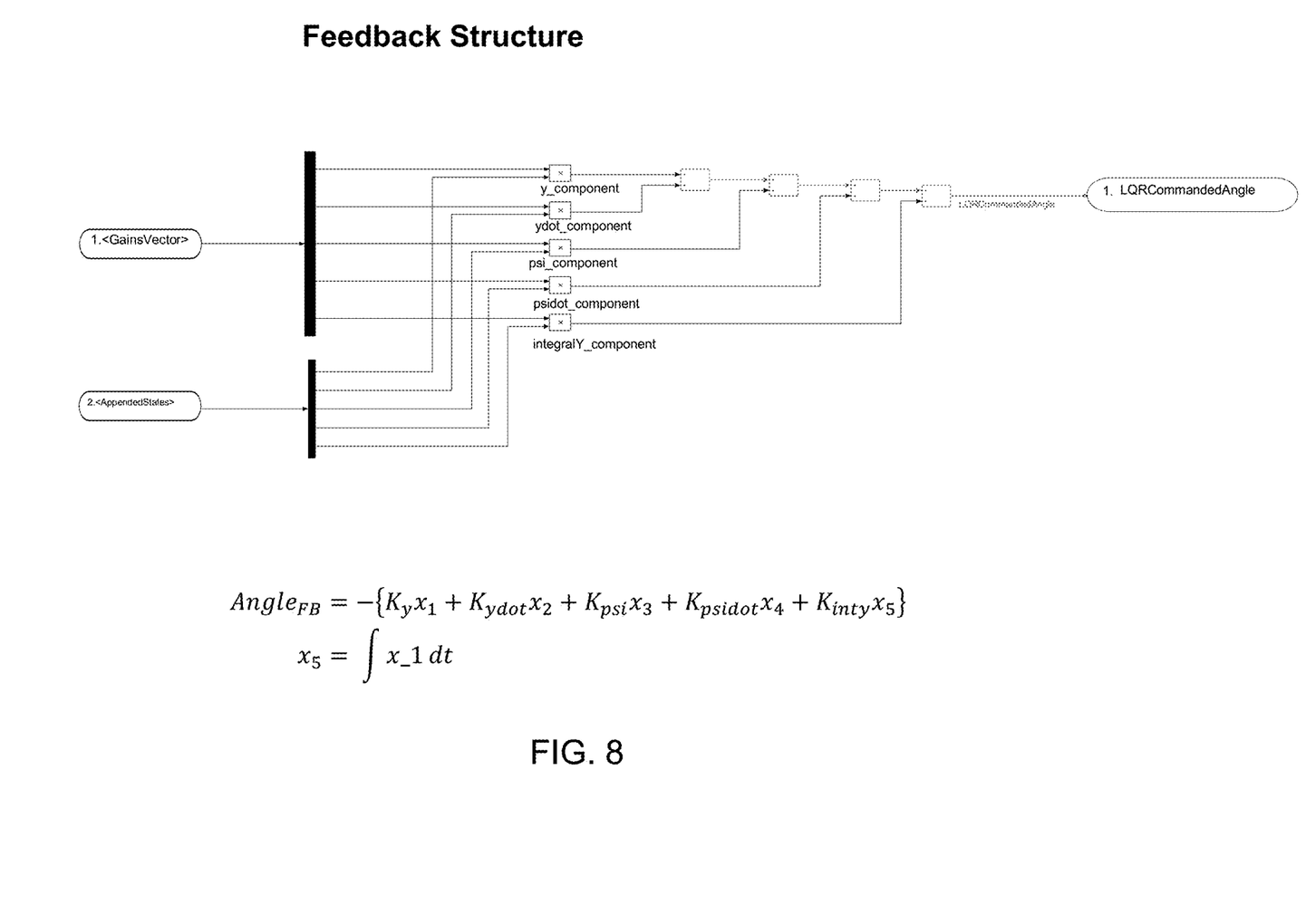
FIG. 8 is a schematic of a feedback system or process of the present invention.

The feedback (FB) state (FIG. 8) may comprise a Linear Quadratic Regulator (LQR) feedback design, which uses five state variables, including lateral position error ($x_1$), lateral velocity error ($x_2$), heading error ($x_3$), yaw rate error ($x_4$), and integral of lateral position error ($x_5$), which provides an "integral action" to help guarantee or improve a final lateral position in the driving path.

Figure 9:
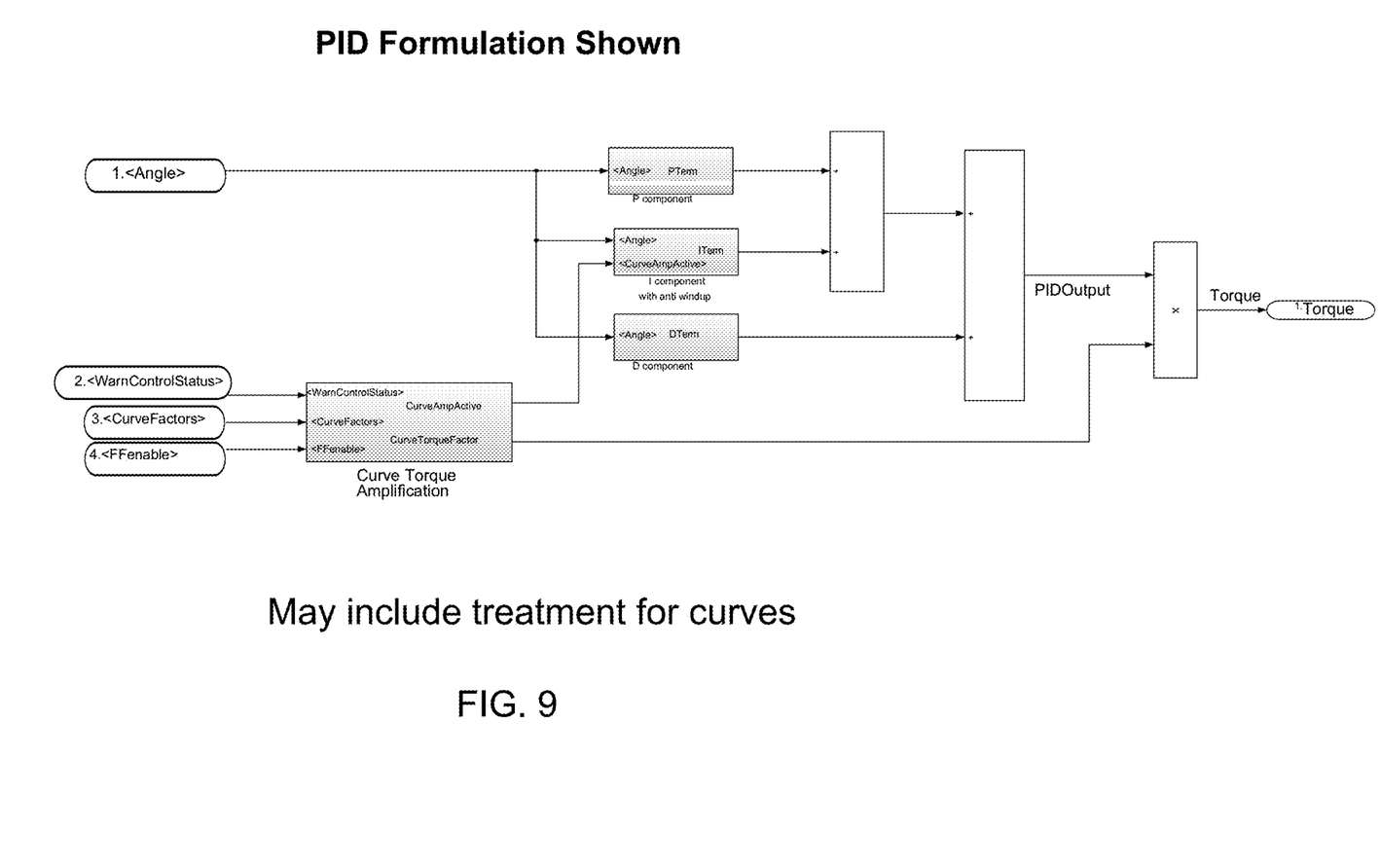
FIG. 9 is a schematic of a PID formulation of the system of the present invention.

The system of the present invention is operable to convert a determined correction angle to a vehicle signal to control the vehicle system accordingly. The system may convert an algorithm request into a valid signal for the vehicle in a manner that may vary based on the particular application and the desired vehicle control. For example, the system may vary a steering rack torque, an electric motor current, and/or an angle (such as varying an angle for customers or applications whose system does conversion for another system). The system or formulation may also vary an inner loop controller (PID, see FIG. 9) to estimate dynamics and/or a dynamic model of power steering interface.

The system may provide an output signal, such as to a vehicle network or bus communication, such as a CAN network bus or the like. Thus, the system may generate a steering control signal that is communicated to the steering system of the vehicle via the vehicle CAN system or network. The system may package information for a receiver, and may include status information, such as active left control, active right control and/or status of the vehicle.

Thus, the system of the present invention provides a lane keeping assist system that uses an adjustable boundary at which the system generates an alert or controls a vehicle function (such as steering). The adjustable boundary line adjusts responsive to the lateral speed of the vehicle relative to the lane marker (with the location of the lane markers determined by the vision system of the vehicle). As the vehicle moves towards the lane marker, it has potential to depart the lane. The imaginary boundary line is determined (such as at an initial location near the determined lane markers) and may move toward the vehicle as the vehicle moves toward the lane marker, with the rate of movement of the imaginary boundary line being dependent on the lateral rate of travel of the vehicle towards the determined lane marker or lane edge. In other words, the faster the vehicle moves towards the lane marker (towards departure from the lane), the faster the imaginary boundary line at that side of the lane moves towards the vehicle (or towards a centerline of the determined lane). When the control determines that the vehicle is at or crosses the imaginary boundary line (such as via image processing of image data captured by a camera of the vehicle, with the system determining a distance of the vehicle from the determined lane boundary or marker and the system determining when the vehicle location corresponding to that distance is at or near the virtual or imaginary boundary line), the system acts to control the vehicle (and/or generate an alert to the driver) to limit the vehicle from further crossing the boundary line and from crossing the lane marker (which is outboard of the imaginary boundary line). The virtual/imaginary boundary line moves towards the vehicle dependent on vehicle movement toward the lane marker or lane edge.

If the vehicle is moving slowly (drifting), then the imaginary line may move very slowly. If the vehicle moves quickly towards the lane boundary or markers, the imaginary line moves quickly, so the vehicle crosses the imaginary line quicker, which results in the system responding faster (thus a faster response time is provided due to a faster crossing of the imaginary line when the vehicle moves laterally quickly). If the vehicle is moving straight or generally centered within its lane (and generally parallel to the lane markers and the imaginary line), the imaginary line is not moved or adjusted. However, if the vehicle moves slowly towards the lane boundary, the imaginary line may slowly move inward, and if the vehicle rapidly moves laterally (relative to the determined lane marker), then the imaginary line moves inboard faster in order to provide a faster start time for the control so the system has time to control the vehicle and keep the vehicle in the lane.

When traveling along a curved section of road, the system adjusts the imaginary line and the corrections depending on whether the vehicle is traveling along an inner part of the curved lane or an outer part of the curved lane. For example, if the vehicle follows the inboard lane boundary (such as if the vehicle cuts the curve), then the system does not adjust or control the vehicle as much (and allows the vehicle to cut the corner a little by hugging the inside boundary), but if the vehicle is at the outboard lane boundary, the system provides a more rapid and stronger correction (as compared to correction at inboard lane boundary) to limit or preclude the vehicle from traveling out of the curved lane at the outboard edge.

The system of the present invention also provides for a variable filter (Kalman Filter) for different operating speeds of the vehicle. As the vehicle speed varies, the system adjusts the processing and control for different speeds. For example, the system may include a plurality of pre-computed or predetermined filters for different vehicle speeds. During operation, the system may select an appropriate filter for any given speed or range of speeds of the vehicle. The system thus adapts for different speeds without having to re-compute the entire model. This selection of predetermined and stored filters saves processing power, where a particular or appropriate filter may be selected according to the vehicle speed.

Once the vehicle starts to depart the determined lane (i.e., the vehicle reaches or crosses over the imaginary boundary line), the system provides a preprogrammed amount of torque at the steering system of the vehicle (as a function of the vehicle's lateral velocity relative to the lane boundary), with a higher torque applied to the steering if the vehicle is moving laterally quickly. The faster the lateral movement of the vehicle, the greater the torque is that is applied, in order to quickly urge or "bounce" the vehicle back into the lane. Once the vehicle is in the lane, the FB then adjusts the vehicle steering at a lower level to center the vehicle and control the vehicle to get/maintain the vehicle in the lane.

The physical lane markers or lane boundaries may be determined via image processing of image data captured by a forward viewing camera disposed at the vehicle (such as at a front portion of the vehicle and viewing forward of the vehicle or at and behind the windshield of the vehicle and viewing through the windshield of the vehicle or the like). The lateral velocity of the vehicle in the determined lane and relative to the determined lane boundary or marker and the virtual/imaginary boundary may be determined via any suitable means, such as responsive to image processing of image data captured by a forward viewing camera of the vehicle (and/or a sideward and/or rearward viewing camera) or the like. The system, knowing the vehicle's location relative to the determined lane boundary or boundaries, is operable to determine that the vehicle is moving laterally towards the determined lane boundary and can determine when the vehicle moves sufficiently laterally so as to approach and cross over the virtual/imaginary boundary line (such as by determining, via image processing of captured image data, when the vehicle is within a selected distance from the determined lane boundary).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715, 093; 6,922,292; 6,757,109; 6,717,610; 6,590,719; 6,201, 642; 5,796,094; 6,559,435; 6,831,261; 6,822,563; 6,946, 978; 7,720,580; 8,542,451; 7,965,336; 7,480,149; 5,550, 677; 5,877,897; 6,498,620; 5,670,935; 5,796,094; 6,396, 397; 6,806,452; 6,690,268; 7,005,974; 7,937,667; 7,123, 168; 7,004,606; 6,946,978; 7,038,577; 6,353,392; 6,320, 176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

Optionally, the vision system may include a display for displaying images captured by one or more of the imaging sensors for viewing by the driver of the vehicle while the driver is normally operating the vehicle. The display may comprise any suitable devices and systems and optionally may utilize aspects of the display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties.

Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular lane keeping assist system, said vehicular lane keeping assist system comprising:
   a camera disposed at a vehicle equipped with said vehicular lane keeping assist system so as to have a field of view forward of the equipped vehicle;
   a control comprising a processor that processes image data captured by said camera to determine first and second lane boundaries defining a traffic lane of a road traveled by the equipped vehicle;
   wherein, when the equipped vehicle is traveling along a curved section of the road traveled by the equipped vehicle, (i) the determined first lane boundary comprises a radially inboard lane boundary of the traffic lane along the curved section of the road, and (ii) the determined second lane boundary comprises a radially outboard lane boundary of the traffic lane along the curved section of the road;
   wherein, when the equipped vehicle is traveling along the curved section of the road traveled by the equipped vehicle, said control controls steering of the equipped vehicle at a first degree responsive to determination, via processing at said control of image data captured by said camera, that the equipped vehicle is at or near the determined first lane boundary of the traffic lane of the road traveled by the equipped vehicle;
   wherein, when the equipped vehicle is traveling along the curved section of the road traveled by the equipped vehicle, said control controls steering of the equipped vehicle at a second degree responsive to determination, via processing at said control of image data captured by said camera, that the equipped vehicle is at or near the determined second lane boundary of the traffic lane of the road traveled by the equipped vehicle; and
   wherein the first degree of steering control is less than the second degree of steering control.

2. The vehicular lane keeping assist system of claim 1, wherein, responsive to said control determining, via processing at said control of image data captured by said camera, that the equipped vehicle is moving towards one of the determined first and second lane boundaries, said control controls steering of the equipped vehicle.

3. The vehicular lane keeping assist system of claim 2, wherein, responsive to determination, via processing at said control of image data captured by said camera, that the equipped vehicle, when moving towards one of the determined first and second lane boundaries, would cross that determined lane boundary, said control controls steering of the equipped vehicle to initially rapidly steer the equipped vehicle back towards a center of the traffic lane of the road traveled by the equipped vehicle, and wherein, after the initial rapid steering of the equipped vehicle, said control controls steering to adjust position of the equipped vehicle in the traffic lane at a slower rate as compared to the initial rapid steering.

4. The vehicular lane keeping assist system of claim 3, wherein said control controls steering of the equipped vehicle with a degree of steering dependent on lateral speed of the equipped vehicle relative to the determined first and second lane boundaries.

5. The vehicular lane keeping assist system of claim 2, wherein said control controls steering of the equipped vehicle with a degree of steering dependent on lateral speed of the equipped vehicle relative to the determined first and second lane boundaries.

6. The vehicular lane keeping assist system of claim 2, wherein said control controls steering of the equipped vehicle by generating an output signal to a communication bus of the equipped vehicle.

7. The vehicular lane keeping assist system of claim 1, wherein said control includes a Kalman Filter, and wherein, responsive to a speed of the equipped vehicle, said control selects an appropriate Kalman Filter out of a plurality of predetermined Kalman Filters.

8. The vehicular lane keeping assist system of claim 1, wherein said vehicular lane keeping assist system accounts for errors that may occur in operation of said vehicular lane keeping assist system.

9. The vehicular lane keeping assist system of claim 1, wherein, responsive to determination, via processing at said control of image data captured by said camera, that the equipped vehicle, when moving towards one of the determined first and second lane boundaries, would cross that determined lane boundary, said control generates an alert to a driver of the equipped vehicle.

10. The vehicular lane keeping assist system of claim 1, wherein said control establishes first and second virtual boundary lines at initial locations relative to the respective determined first and second lane boundaries, and wherein the initial locations of the first and second virtual boundary lines are at or inboard of the respective determined first and second lane boundaries, and wherein said control, responsive to lateral speed of the equipped vehicle relative to the determined first and second lane boundaries, laterally adjusts the first and second virtual boundary lines relative to the respective determined first and second lane boundaries, and wherein, responsive to said control determining, via processing at said control of image data captured by said camera, that the equipped vehicle, when moving towards one of the determined first and second lane boundaries, would cross the respective one of the first and second virtual boundary lines, said control generates an alert to a driver of the equipped vehicle.

11. The vehicular lane keeping assist system of claim 10, wherein said control adjusts location of the respective one of the first and second virtual boundary lines inboard by an amount dependent on lateral speed of the equipped vehicle relative to the determined lane boundary that the equipped vehicle is moving towards.

12. The vehicular lane keeping assist system of claim 10, wherein said control adjusts location of the respective one of the first and second virtual boundary lines inboard at a rate dependent on lateral speed of the equipped vehicle relative to the determined lane boundary that the equipped vehicle is moving towards.

13. The vehicular lane keeping assist system of claim 1, wherein said control adjusts control of steering of the equipped vehicle responsive at least in part to determination, via processing at said control of image data captured by said camera, that the equipped vehicle is traveling along the curved section of the road traveled by the equipped vehicle.

14. A vehicular lane keeping assist system, said vehicular lane keeping assist system comprising:
   a camera disposed at a vehicle equipped with said vehicular lane keeping assist system so as to have a field of view forward of the equipped vehicle;
   a control comprising a processor that processes image data captured by said camera to determine first and second lane boundaries defining a traffic lane of a road traveled by the equipped vehicle;

wherein, responsive to said control determining, via processing at said control of image data captured by said camera, that the equipped vehicle is moving towards one of the determined first and second lane boundaries, said control controls steering of the equipped vehicle;

wherein said control controls steering of the equipped vehicle by generating an output signal to a communication bus of the equipped vehicle;

wherein said control controls steering of the equipped vehicle with a degree of steering dependent on lateral speed of the equipped vehicle relative to the determined first and second lane boundaries;

wherein, when the equipped vehicle is traveling along a curved section of the road traveled by the equipped vehicle, (i) the determined first lane boundary comprises a radially inboard lane boundary of the traffic lane along the curved section of the road, and (ii) the determined second lane boundary comprises a radially outboard lane boundary of the traffic lane along the curved section of the road;

wherein, when the equipped vehicle is traveling along the curved section of the road traveled by the equipped vehicle, said control controls steering of the equipped vehicle at a first degree responsive to determination, via processing at said control of image data captured by said camera, that the equipped vehicle is at or near the determined first lane boundary of the traffic lane of the road traveled by the equipped vehicle;

wherein, when the equipped vehicle is traveling along the curved section of the road traveled by the equipped vehicle, said control controls steering of the equipped vehicle at a second degree responsive to determination, via processing at said control of image data captured by said camera, that the equipped vehicle is at or near the determined second lane boundary of the traffic lane of the road traveled by the equipped vehicle; and wherein the first degree of steering control is less than the second degree of steering control.

15. The vehicular lane keeping assist system of claim 14, wherein, responsive to determination, via processing at said control of image data captured by said camera, that the equipped vehicle, when moving towards one of the determined first and second lane boundaries, would cross that determined lane boundary, said control controls steering of the equipped vehicle to initially rapidly steer the equipped vehicle back towards a center of the traffic lane of the road traveled by the equipped vehicle, and wherein, after the initial rapid steering of the equipped vehicle, said control controls steering to adjust position of the equipped vehicle in the traffic lane at a slower rate as compared to the initial rapid steering.

16. The vehicular lane keeping assist system of claim 14, wherein, responsive to determination, via processing at said control of image data captured by said camera, that the equipped vehicle, when moving towards one of the determined first and second lane boundaries, would cross that determined lane boundary, said control generates an alert to a driver of the equipped vehicle.

17. The vehicular lane keeping assist system of claim 14, wherein said control adjusts control of steering of the equipped vehicle responsive at least in part to determination, via processing at said control of image data captured by said camera, that the equipped vehicle is traveling along the curved section of the road traveled by the equipped vehicle.

18. A vehicular lane keeping assist system, said vehicular lane keeping assist system comprising:

a camera disposed at a vehicle equipped with said vehicular lane keeping assist system so as to have a field of view forward of the equipped vehicle;

a control comprising a processor that processes image data captured by said camera to determine first and second lane boundaries defining a traffic lane of a road traveled by the equipped vehicle;

wherein said control establishes first and second virtual boundary lines at initial locations relative to the respective determined first and second lane boundaries, and wherein the initial locations of the first and second virtual boundary lines are at or laterally inboard of the determined first and second lane boundaries;

wherein said control, responsive to lateral speed of the equipped vehicle relative to the determined first and second lane boundaries, laterally adjusts at least one of the first and second virtual boundary lines relative to the respective determined first and second lane boundaries;

wherein, when the equipped vehicle is traveling along a curved section of the road traveled by the equipped vehicle, (i) the determined first lane boundary comprises a radially inboard lane boundary of the traffic lane along the curved section of the road, and (ii) the determined second lane boundary comprises a radially outboard lane boundary of the traffic lane along the curved section of the road;

wherein, when the equipped vehicle is traveling along the curved section of the road traveled by the equipped vehicle, said control controls steering of the equipped vehicle at a first degree responsive to determination, via processing at said control of image data captured by said camera, that the equipped vehicle is at or near the first virtual boundary line that is radially outboard of the determined first lane boundary;

wherein, when the equipped vehicle is traveling along the curved section of the road traveled by the equipped vehicle, said control controls steering of the equipped vehicle at a second degree responsive to determination, via processing at said control of image data captured by said camera, that the equipped vehicle is at or near the second virtual boundary line that is radially inboard of the determined second lane boundary; and wherein the first degree of steering control is less than the second degree of steering control.

19. The vehicular lane keeping assist system of claim 18, wherein, responsive to said control determining, via processing at said control of image data captured by said camera, that the equipped vehicle is moving towards one of the first and second virtual boundary lines, said control controls steering of the equipped vehicle.

20. The vehicular lane keeping assist system of claim 19, wherein said control controls steering of the equipped vehicle by generating an output signal to a communication bus of the equipped vehicle.

21. The vehicular lane keeping assist system of claim 19, wherein, responsive to determination, via processing at said control of image data captured by said camera, that the equipped vehicle, when moving towards one of the first and second virtual boundary lines, would cross that virtual boundary line, said control controls steering of the equipped vehicle to initially rapidly steer the equipped vehicle back towards a center of the traffic lane of the road traveled by the equipped vehicle, and wherein, after the initial rapid steering of the equipped vehicle, said control controls steering to adjust position of the equipped vehicle in the traffic lane at a slower rate as compared to the initial rapid steering.

22. The vehicular lane keeping assist system of claim 18, wherein, responsive to determination, via processing at said control of image data captured by said camera, that the equipped vehicle, when moving towards one of the determined first and second lane boundaries, would cross a respective one of the first and second virtual boundary lines, said control generates an alert to a driver of the equipped vehicle.

23. The vehicular lane keeping assist system of claim 22, wherein said control adjusts location of the respective virtual boundary line inboard by an amount dependent on lateral speed of the equipped vehicle relative to the one of the determined first and second lane boundaries that the equipped vehicle is moving towards.

24. The vehicular lane keeping assist system of claim 22, wherein said control adjusts location of the respective virtual boundary line inboard at a rate dependent on lateral speed of the equipped vehicle relative to the one of the determined first and second lane boundaries that the equipped vehicle is moving towards.

25. The vehicular lane keeping assist system of claim 18, wherein said control adjusts control of steering of the equipped vehicle responsive at least in part to determination, via processing at said control of image data captured by said camera, that the equipped vehicle is traveling along the curved section of the road traveled by the equipped vehicle.

* * * * *